United States Patent
Vitack et al.

[11] 3,934,622
[45] Jan. 27, 1976

[54] TIRE SAVER

[76] Inventors: George Vitack; Rose Vitack; Josephine Vitack, all of c/o George Spector, 3615 Woolworth Bldg., 233 Broadway; George Spector, 3615 Woolworth Bldg., 233 Broadway, all of New York, N.Y. 10007

[22] Filed: July 16, 1973

[21] Appl. No.: 379,617

[52] U.S. Cl. .................................. 141/18; 222/130
[51] Int. Cl.² ........................................... B65B 3/04
[58] Field of Search ................. 141/18, 38; 222/130

[56] References Cited
UNITED STATES PATENTS

| | | | |
|---|---|---|---|
| 2,498,596 | 2/1950 | Wallach | 141/38 |
| 2,746,647 | 5/1956 | Efford et al. | 222/130 |
| 3,183,945 | 5/1965 | Edwards | 141/38 |
| 3,335,766 | 8/1967 | Winger | 141/38 |

FOREIGN PATENTS OR APPLICATIONS

| | | | |
|---|---|---|---|
| 704,056 | 5/1970 | France | 222/130 |

*Primary Examiner*—Houston S. Bell, Jr.

[57] ABSTRACT

A portable tank containing compressed air, the tank being with a removable end cap so to expose for use an operating handle and valves for refilling and releasing the pressurized air, the releasing valve being adaptable for connection to an automotive vehicle tire valve, so that the device can be conveniently carried in a car and be always handy to use in case a tire pressure is down and a service station is not close by.

2 Claims, 2 Drawing Figures

U.S. Patent  Jan. 27, 1976  3,934,622
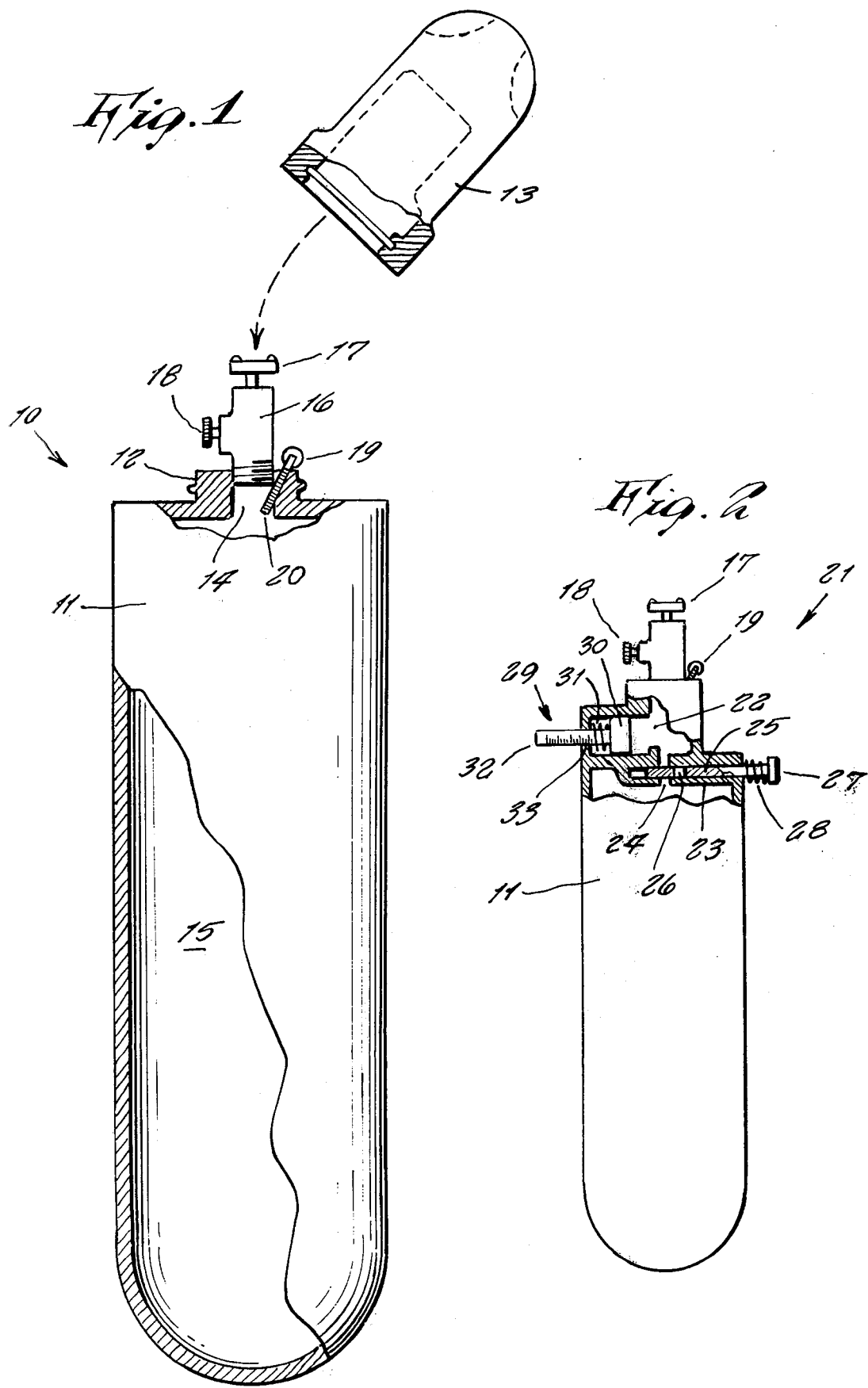

TIRE SAVER

This invention relates generally to automotive vehicles. More specifically it relates to automotive vehicle accessories.

It is generally well experienced by most motorists that upon occasion a tire appears to have suddenly lost air. Such surprising discovery often is noticed even after the car has been standing many hours such as overnight. A small leak may have developed such as by riding over a nail or the like so that the tire may be down too far so to ride upon it to a nearby automotive service station without the wheel rim cutting the tire. Accordingly, the motorist is obliged to perform the undesirable chore of changing a tire before he can proceed to travel. This situation accordingly is in want of an improvement.

Accordingly, it is a principle object of the present invention to provide a means whereby a slow leaking tire may be re-inflated so an automobile may proceed to travel to a service station where a proper repair may be done.

Another object is to provide a tank of pressurized air that can be conveniently transported in a car so to be always handy in case of a failing air pressure in a tire while far from a service station.

Other objects are to provide a tire saver which is simple in design, inexpensive to manufacture, rugged in construction, easy to use and efficient in operation.

These and other objects will be readily evident upon a study of the following specification and the accompanying drawing wherein:

FIG. 1 is a side view of the invention shown partly in cross section.

FIG. 2 is a similar view of a modified design of the invention and which includes a pressure gauge that works automatically to inform the amount of pressure in the object being inflated, thus eliminating need to stop and remove the device to replace it by a separate pressure gauge, thus allowing the job to be done quicker.

Referring now to the drawing in detail, the reference numeral 10 represents a tire saver according to the present invention, wherein there is shown in FIG. 1 a pressure tank 11 having a neck 12 at one end over which a removable end cap 13 is fitted. An opening 14 through the neck communicates with tank interior 15 and a screw threaded so to engage valve housing 16 and which contains a valve 17 adaptable for connection to a hose fitting of an air pump at an automotive service station so that the tank can be filled with compressed air. A handle 18 serves to shut off the valve; another valve 19 communicates with opening 14 and includes a threaded pipette 20 fitted in the neck and which is adaptable for connection to a valve of a car tire, so that compressed air from the tank can be put in to the tire.

In FIG. 2, a modified design 21 of the invention includes all of the above described elements and additionally includes a means whereby the tank indicates the existing tire pressure while inflating the same so to more quickly and easily accomplish the job without need of a separate tire pressure gauge. The tire saver 21 includes a separate air chamber 22 that communicates with the opening 14, and which is separated from tank interior 15 by a wall 23. An opening 24 through the wall 23 connects chamber 22 and tank interior 15, the opening 24 being closable by a sliding valve 25 having cross opening 26 which when disaligned with the opening 24 as shown in the drawing, prevents air to escape outward from interior 15. When knob 27 is depressed against action of spring 28, openings 24 and 26 align and allow dispensing air. An air gauge 29 in chamber 22 includes piston head 30, compression spring 31, and a calibrated scale 32 that protrudes slidably through opening 33 outwardly so it can be read. Thus the tire pressure is checked during inflation.

While various changes may be made in the detail construction, it is understood that such changes will be within the spirit and scope of the present invention as is defined by the appended claims.

We claim:

1. An air pressure tank for tire inflation, comprising an air pressure storage chamber, a tire inflation chamber, an inlet to said inflation chamber and a partition separating the storage chamber from the inflation chamber, including a passageway through said portion providing communication between said chambers, in further combination with a normally closed valve controlling flow through said passageway, including an inlet valve mounted in said inlet for filling the tank with air, further including a pressure guage mounted in the inflation chamber and extending slidably through the tank to the exterior to indicate the pressure in said inflation chamber, in still further combination with a tire inflation valve communicating with the inflation chamber for tire inflating purposes.

2. A tank as in claim 1, wherein the first said valve comprises a transversely slidable plate mounted in said portion having an opening therethrough, said plate being movable to a position which aligns the opening with the passageway and means for normally retaining the plate in a position closing the passageway, said plate having an external handle for manual actuation.

* * * * *